United States Patent
Harden

(10) Patent No.: US 9,554,639 B1
(45) Date of Patent: Jan. 31, 2017

(54) ACTION CAMERA FOOT MOUNT

(71) Applicant: BBY SOLUTIONS, INC., Richfield, MN (US)

(72) Inventor: Kenneth Harden, Eden Prairie, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

(21) Appl. No.: 15/084,066

(22) Filed: Mar. 29, 2016

(51) Int. Cl.
*A45F 5/00* (2006.01)
*G03B 17/56* (2006.01)

(52) U.S. Cl.
CPC ............... *A45F 5/00* (2013.01); *G03B 17/561* (2013.01); *A45F 2005/008* (2013.01)

(58) Field of Classification Search
None
See application file for complete search history.

(56) References Cited

U.S. PATENT DOCUMENTS

| | | | |
|---|---|---|---|
| 2006/0027615 A1* | 2/2006 | Masi ..................... | A43B 3/0031 224/222 |
| 2013/0004153 A1 | 1/2013 | McKee et al. | |
| 2013/0101277 A1* | 4/2013 | Barreiro ............... | G03B 17/561 396/55 |
| 2014/0321843 A1 | 10/2014 | Hulse | |
| 2015/0323858 A1* | 11/2015 | Stephens ................ | F16M 13/04 396/423 |
| 2016/0131963 A1* | 5/2016 | Clearman ............ | G03B 17/561 224/267 |
| 2016/0190857 A1* | 6/2016 | Slater ................... | G03B 17/566 320/108 |
| 2016/0299412 A1* | 10/2016 | Webster ............... | G03B 17/561 |

OTHER PUBLICATIONS

"Flugsau GoPro Foot Mount / 95.00 CHF", [online]. Retrieved from the Internet: <URL: http://www.flugsau.ch/flugsaugoprofootmountp228.html?language=e>, (2016), 3 pgs.
"Flugsau GoPro Foot Mount Pro / 127.00 CHF", [online]. Retrieved from the Internet: <URL: http://www.flugsau.ch/flugsaugoprofootmountp332.html>, (2016), 1 pg.
(Continued)

*Primary Examiner* — William B Perkey
(74) *Attorney, Agent, or Firm* — Schwegman Lundberg & Woessner, P.A.

(57) ABSTRACT

Devices and methods disclosed here can include a foot mount, such as an action camera foot mount. The action camera foot mount can include a harness having a toe loop and an ankle loop. The harness can include an elastic material and can be in tension between the toe loop and the ankle loop. The toe loop can encircle a toe of the user and the ankle loop can encircle an ankle of the user to secure the harness to the foot of the user. In an example, at least one midportion can be disposed between the toe loop and the ankle loop of the harness. A base member can be coupled to the harness and the base member can include a camera mount for attaching an action camera to the harness. In an example, the base member can be slidably coupled along the midportion.

23 Claims, 5 Drawing Sheets

(56) References Cited

OTHER PUBLICATIONS

"Go Pro Foot Mount", [online]. © 2015 Specked Out. [archived on Nov. 25, 2015]. Retrieved from the Internet: <URL: https://web.archive.org/web/20151125185130/http://speckedout.com/prod-detail.asp?prod=Foot-Mount>, (2015), 3 pgs.

"GoPro—The Strap—GoPro hand + wrist + arm + leg mount", [online]. [archived on Dec. 21, 2015]. Retrieved from the Internet: <URL:https://web.archive.org/web/20151221181628/http://shop.gopro.com/mounts/the-strap-hand-plus-wrist-plus-arm-plus-leg-mount/AHWBM-001.html>, (2015), 1 pg.

* cited by examiner

ACTION CAMERA FOOT MOUNT

TECHNICAL FIELD

This document pertains generally, but not by way of limitation, to action camera body mounts, such as action camera foot mounts.

BACKGROUND

Action cameras are used by athletes, hobbyists, drivers, pilots, or the like to record still images or video of activities for later viewing. Such devices are frequently used in outdoor environments. Accordingly, action cameras can be protected in environmentally sealed housings, making the action camera suitable for such uses.

Existing action cameras can be attached to the body of a wearer. For instance, the action camera can be coupled to a mount. Existing mounts can include straps that wrap around a wearer's hand, ankle, chest, or leg, and mounts that can strap to a wearer's shoe or footwear. Some action camera mounts include an adapter for orienting the camera toward the wearer or in other orientations to capture views of scenery, the experience of the wearer, other individuals in view of the wearer, or the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
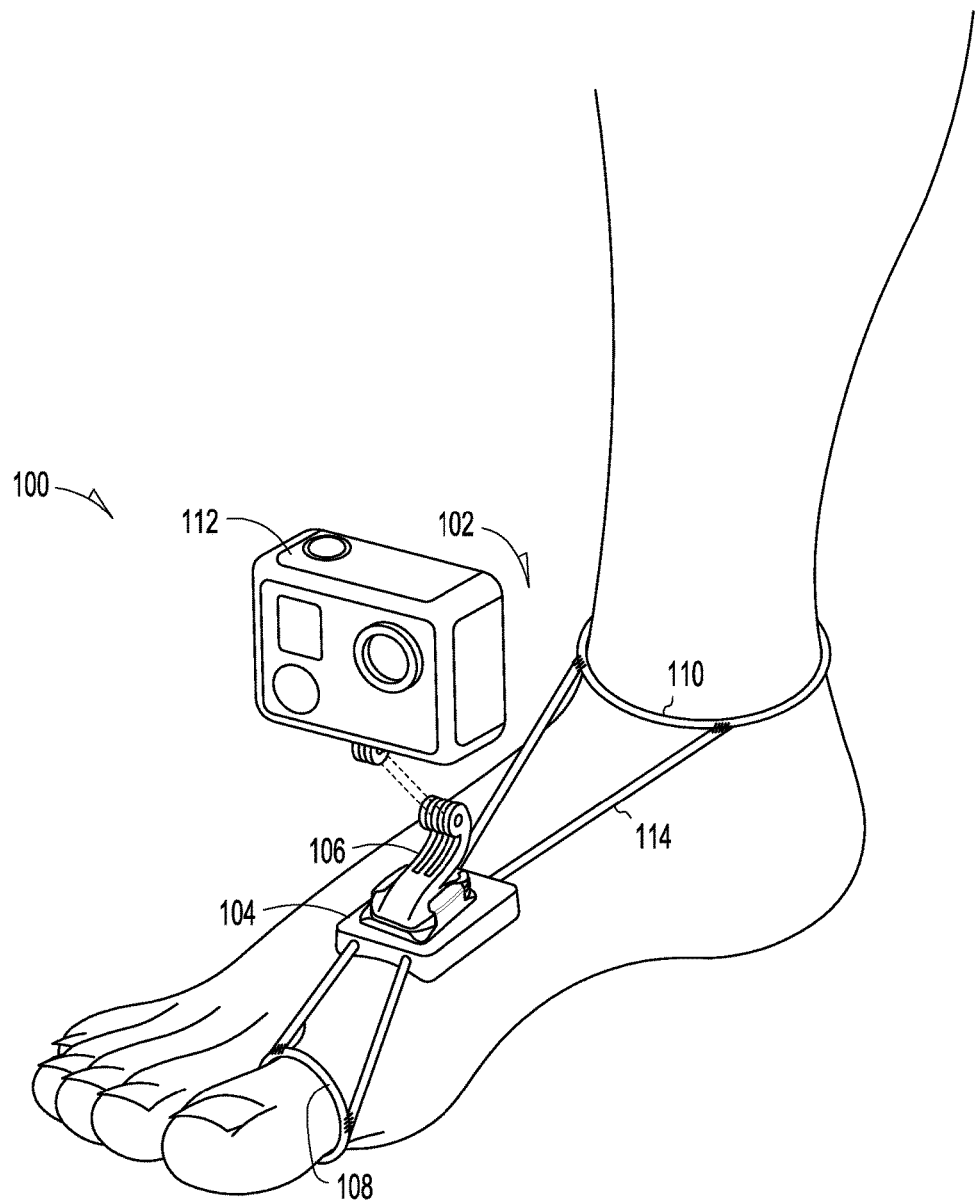
FIG. 1 illustrates an example of an action camera foot mount worn on a foot of a human user, according to an embodiment.

The present application relates to devices and techniques for a foot mount, such as an action camera foot mount. The following detailed description and examples are illustrative of the subject matter disclosed herein; however, the subject matter disclosed is not limited to the following description and examples provided. Portions and features of some embodiments may be included in, or substituted for, those of other embodiments. Furthermore, the embodiments set forth in the claims encompass all available equivalents of those claims.

The present disclosure includes a configuration to enable the mounting of an action camera to a foot of a user, providing a unique camera perspective while mounting an action camera to a foot of a user (such as a bare foot or socked foot) in a manner that does not interfere with the natural traction or flexibility of the foot of the user. This configuration provides significant benefits over existing versions of footwear-based camera mounts. For example, some existing mounts designed for attachment to a user's footwear include straps that wrap around the wearer's footwear, such as underneath the wearer's footwear. Likewise, in many existing mounts, the straps are wrapped around an area of the wearer's footwear corresponding to a location underneath the arch, heel, or ball of the wearer's foot in order to retain the action camera to the wearer's footwear; other types of existing mounts are designed to be incorporated into the wearer's shoe. For instance, some existing mounts involve a user wearing on a special purpose shoe including an action camera mount integrated into the shoe.

The present subject matter offers an improved design over the limitations of existing camera mounts, for instance, by use of a harness including a toe loop and an ankle loop. In an example, the harness can be adapted to fasten to a foot of a user. For instance, the harness can include an elastic material. Accordingly, the harness can be stretched in tension between the toe loop and the ankle loop. The toe loop can encircle a toe of the user and the ankle loop can encircle an ankle of the user to secure the harness to the foot of the user. In an example, at least one midportion can be disposed between the toe loop and the ankle loop of the harness. A base member can be coupled to the harness and the base member can include a camera mount for attaching an action camera to the harness to construct an action camera foot mount. In an example, the base member can be slidably coupled along the midportion. Accordingly, the base member can be adjustably positioned along the midportion and the harness can stretch or flex along with the foot of the user without restriction from the base member.

The present subject matter also offers an improved design over the limitations of existing camera mounts, for instance, by mounting an action camera to the foot and providing lateral stability to the action camera, such as with two or more midportions disposed between the toe loop and the ankle loop. For instance a first midportion can be coupled between a medial side of the toe loop and a lateral side of the ankle loop, and a second midportion can be coupled between a lateral side of the toe loop and a medial side of the ankle loop. The first midportion can cross over the second midportion at a location between the toe loop and the ankle loop.

The present subject matter also offers an improved design over the limitations of existing camera mounts, for instance, by mounting an action camera to the foot or a user and providing a breakaway safety feature to reduce the likelihood of injury to the user, such as in the event that the action camera foot mount becomes ensnared with another object while the user is moving. For instance, the present design may be constructed from a harness including a harness fastener adapted to releasably couple two or more segments of the harness. In an example, the harness fastener can include an open configuration and a closed configuration. The harness can be securable to the foot of the user where the harness fastener is in the closed configuration, and in the open configuration, the harness can be removable from the foot of the user by decoupling the harness fastener.

FIG. 1 shows a perspective view of an example of an action camera foot mount 100 attached to a foot of a user. The action camera foot mount 100 can include a harness 102, a base member 104, and a camera mount 106. The harness 102 can attach (e.g., secure) the action camera foot mount 100 to the foot of the user. For instance, the harness 102 can include a toe loop 108 that encircles a toe of the user and the ankle loop 110 can encircle an ankle of the user to attach the harness 102 and accordingly the action camera foot mount 100 to the foot. The base member 104 can support an action camera 112. The action camera 112 can include, but is not limited to, a digital camera, a GoPro®, smart phone, weatherproof camera, or the like. In one example, the base member 104 can be slidably coupled to the harness 102. For instance, the base member 104 can be slidably coupled to at least one midportion 114 of the harness 102. The midportion 114 can be disposed between the toe loop 108 and the ankle loop 110 and can be under tension (e.g., stretched) between the toe loop 108 and the ankle loop 110. The tension of the midportion 114 or the harness 102 can increase friction between a top of the foot of the user and the base member 104. The friction as well as a size and shape of the base member 104 can increase the stability of the action camera 112 mounted on the camera mount 106. In other words, the harness 102 can hold the base member 104, and correspondingly the action camera 112, in place on the foot of the user.

Figure 2:
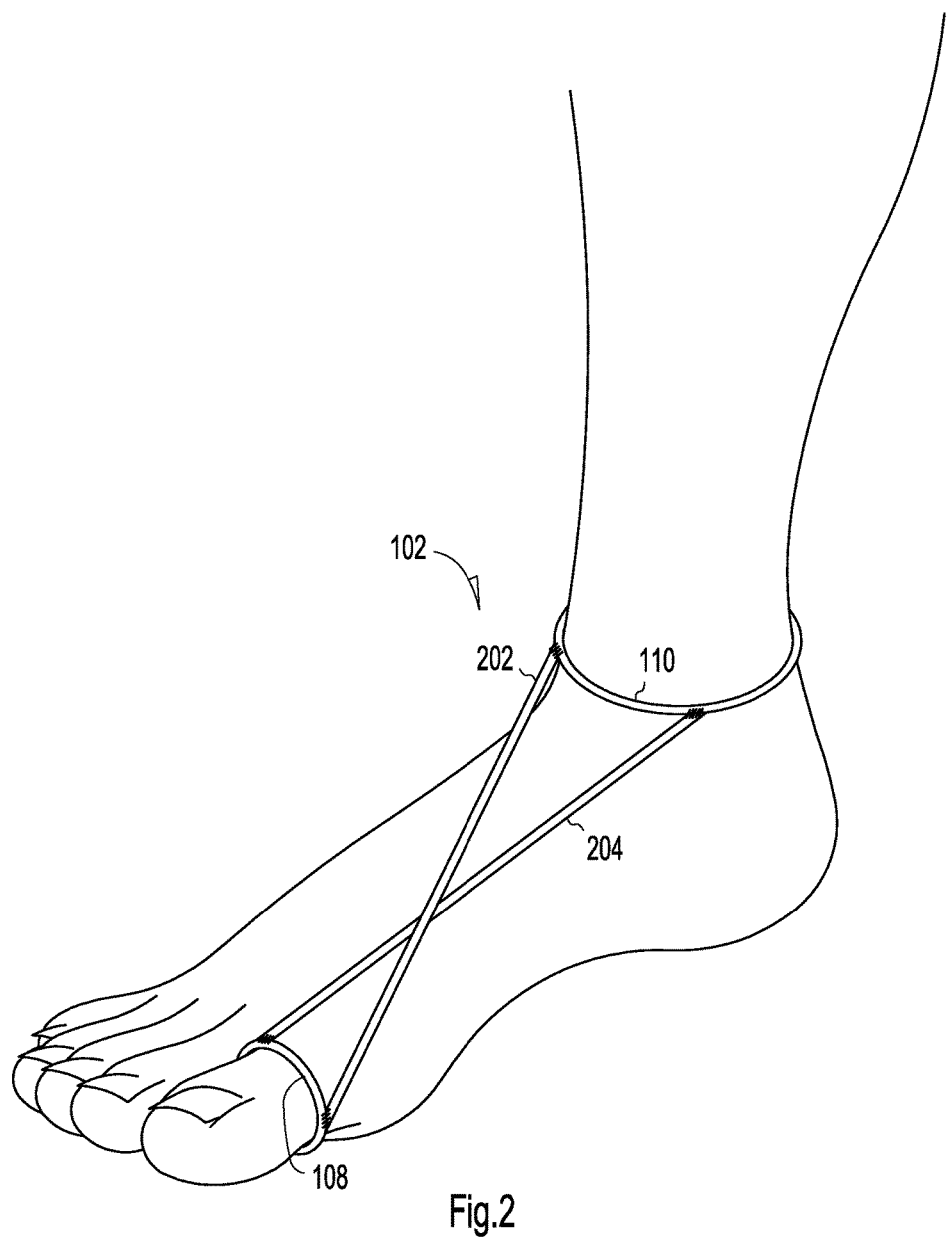
FIG. 2 is a perspective view of an exemplary harness of an action camera foot mount, according to an embodiment.

FIG. 2 shows an exemplary depiction of the harness 102 coupled to the foot of a user. As previously discussed, the harness 102 can include a toe loop 108, an ankle loop 110, and at least one midportion 114. Each of the toe loop 108, ankle loop 110, or mid portion 114 can be referred to herein as a portion of the harness 102. In the example of FIG. 2, the harness 102 includes two midportions 114. In an example, the harness 102, including the toe loop 108, the ankle loop 110, and the at least one midportion 114, can be a unitary component. For instance, the portions of the harness 102 can be constructed of a single cord or strap. In an example, the portions of the harness 102 can be attached to one another by stitching, weaving, adhesive, fasteners (e.g., rivets or staples), ties, clips, ultrasonic welding, thermal bonding, or the like. Any of the one or more portions can be coupled to any other portion. For instance, the toe loop 108 can be coupled to the midportion 114, the ankle loop 110, or both. In an example, two or more portions of the harness 102 can include a unitary construction (unitary portion) and the unitary portion can be coupled to another portion of the harness 102. For instance the toe loop 108 and the midportion 114 can be the unitary portion and the unitary portion can be coupled to the ankle loop 110. The portions of the harness 102 including but not limited to, the toe loop 108, the ankle loop 110, or the midportion, can be constructed from a material including, but not limited to, a fabric, polymer (e.g., nylon or neoprene), leather, natural or synthetic fiber, natural or synthetic rubber, or the like. In an example the material can be elastic.

Figure 3:
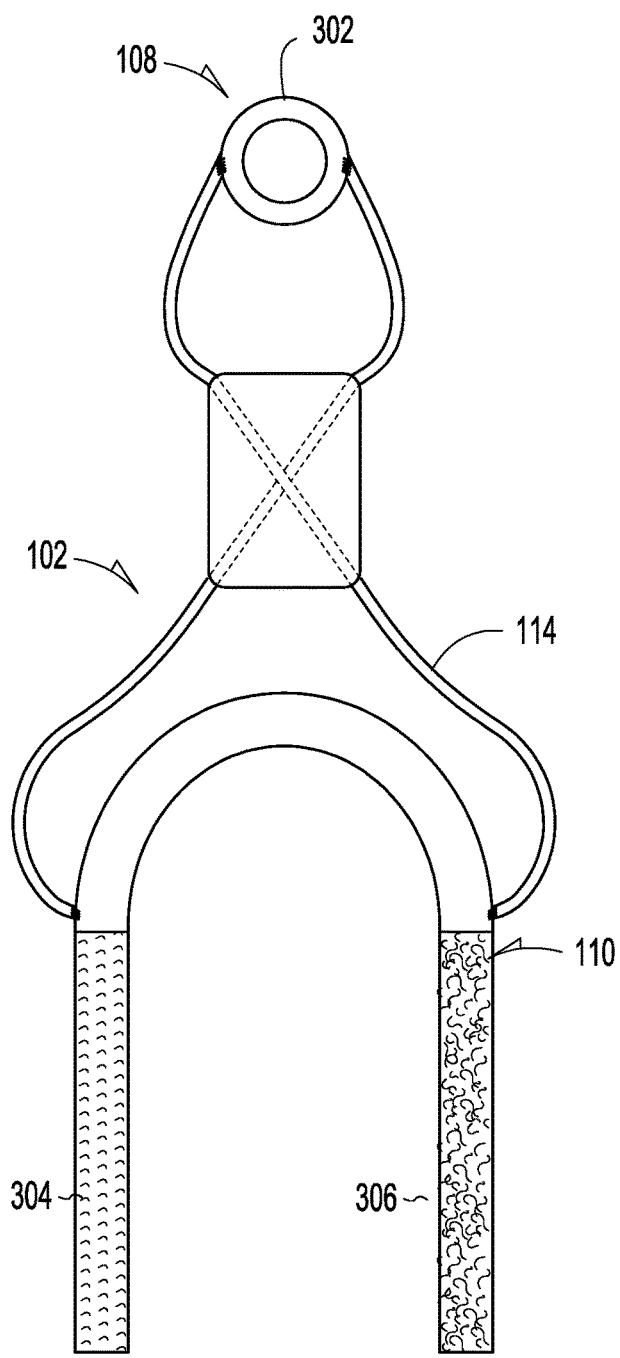
FIG. 3 illustrates an example of an action camera foot mount including a toe pad and an ankle pad, according to an embodiment.

The toe loop 108 can be a cord, strap, webbing, or the like that partially or fully encircles the toe of the user. For instance the toe loop 108 can be adapted for the insertion of the toe of the user to attach the toe loop 108 to the foot of the user. The toe loop 108 can be positionable around a proximal portion of the toe of the user, for example, at a location near the junction of a phalange and a metatarsal. The toe loop 108 can be stretchable around the toe of the user or cinched around the toe of the user. In an example, the toe loop 108 can include a cord lock (i.e., cord toggle) to adjustably cinch the toe loop 108 around the toe of the user. In an example, the toe loop 108 can encircle one or more toes of the user. For instance, the toe loop 108 can encircle one, two, three, four, or five toes of the user, individually or together. In other words the harness 102 can include any number of toe loops 108 one through five that can independently encircle the toes of the user. In an example, the toe loop 108 can be configured in as a toe cap or sock that substantially surrounds the toe of the user. In an example, the toe loop 108 can include a toe pad as shown in FIG. 3 and described herein.

The ankle loop 110 can be a cord, strap, webbing, or the like that partially or fully encircles the ankle of the user. For instance the ankle loop 110 can be adapted for the insertion of the foot of the user to attach the ankle loop 110 to the foot of the user. The ankle loop 110 can be positionable around of the ankle or leg of the user. The ankle loop 110 can be stretchable or cinched around the ankle or leg of the user. In an example, the ankle loop 110 can include a cord lock to adjustably cinch the ankle loop 110 around the ankle of the user. In an example, the ankle loop 110 can include an ankle pad as shown in FIG. 3 and described herein.

The midportion 114 can include a cord, strap, webbing, or the like that is disposed between the toe loop 108 and the ankle loop 110. In an example, the midportion 114 can be stretchable. For instance, where the midportion is constructed of an elastic material, the midportion can be stretchably disposed between the toe loop 108 and the ankle loop 110. Accordingly, the midportion 114 can be under tension between the toe loop 108 and the ankle loop 110, such as when the harness 102 is attached to the foot of the user. The tension can facilitate a secure fit of the harness 102 on the foot by reducing slack in the harness 102 and increasing a holding force of the harness 102 on the foot of the user. Correspondingly, the tension on the harness 102 can result in pressure between the toe loop 108 and the toe of the user and between the ankle loop 110 and the ankle of the user. The pressure can increase friction between the harness 102 and the foot of the user and accordingly facilitate a secure attachment of the harness 102 to the foot.

In the example of FIG. 2, the harness 102 includes two midportions 114, such as a first midportion 202 and a second midportion 204. Each midportion 114 can be coupled between the toe loop 108 and the ankle loop 110. In an example, the first midportion 202 can be independently stretchable from the second midportion 204. In other words, the first midportion 202 can be disconnected (e.g., not directly fastened) from the second midportion 204 between the toe loop 108 and the ankle loop 110. Accordingly, the flexibility of the harness 102 can be increased and the harness 102 can move along with the articulation of the foot of the user. Where the first midportion 202 and the second midportion 204 are coupled between the medial and lateral sides of the toe loop 108 and the ankle loop 110, shifting of the toe loop 108 and the ankle loop 110 on the foot of the user can be decreased. For instance, the tension of the first midportion 202 and the second midportion 204 can minimize rotation and sliding of the toe loop 108 and the ankle loop 110 on the foot.

In an example, the first midportion 202 can be coupled between a medial side of the toe loop 108 and a medial side of the ankle loop 110 and the second midportion 204 can be coupled between a lateral side of the toe loop 108 and a lateral side of the ankle loop 110. In the example of FIG. 2, the first midportion 202 can cross over the second midportion 204 (e.g., a crossed configuration). For instance, the first midportion 202 can be coupled between a medial side of the toe loop 108 and a lateral side of the ankle loop 110, and the second midportion 204 can be coupled between a lateral side of the toe loop 108 and a medial side of the ankle loop 110. Accordingly the first midportion 202 can cross over the second midportion 204 between the toe loop 108 and the ankle loop 110. The crossed configuration can further minimize rotation and sliding of the harness 102 on the foot. For instance, a lateral force applied to the first midportion 202

(e.g., by the weight or momentum of the action camera 112) can be resisted by the tension of the second midportion 204, and a lateral force applied to the second midportion 204 can be resisted by the tension of the first midportion 202.

In an example, the action camera foot mount 100 can include at least one midportion 202 coupled between the toe loop 108 and the base member 104 and at least one midportion 202 coupled between the ankle loop 110 and the base member 104. For instance, each of the midportions 202 can be attached to the base member 104 by stitching, clamping, weaving, welding, tying, fastening, or otherwise coupling the midportion 202 to the base member 104. Accordingly, each of the midportions 202 can be independently stretchable with respect to the other midportions 202.

FIG. 3 depicts an exemplary action camera foot mount 100 unattached from the foot of a user. The first midportion 202 and the second midportion 204 can be arranged in the crossed configuration as shown in FIGS. 1-2 and described herein. In an example, the action camera foot mount 100 can include a toe pad 302, an ankle pad 304, or both as shown in FIG. 3. For instance, the toe pad 302 can be coupled, to or integral with, the toe loop 108, and the ankle pad 304 can be coupled to, or integral with, the ankle loop 110. The toe pad 302 and ankle pad 304 can be stitched, woven, fastened, thermally bonded, welded, or otherwise coupled to the respective toe loop 108 or ankle loop 110. In an example, the toe loop 108 includes toe pad features as a unitary toe loop, and the ankle loop 110 includes ankle pad features as a unitary ankle loop.

The toe pad 302 can include a surface for reducing pressure on the toe of the user from the tension of the harness 102. For instance, the toe pad 302 can distribute the holding force of the harness along an increased area of the toe. The toe pad 302 can have a shape that includes, but is not limited to a loop, donut, strap, flat segment, contour, or other shape. Accordingly, the toe pad 302 can conform to the foot of the user or have a contour shape adapted to be molded to the shape of the foot of the user. In the example of FIG. 3, the toe pad 302 is a ring with a flat surface. The toe of the user can be inserted through the ring for attaching the toe loop 108 to the foot. In an example, a material of the toe pad 302 can include a fabric, polymer (e.g., nylon or neoprene), leather, natural or synthetic fiber, natural or synthetic rubber, or the like. In one or more examples, the material of the toe pad 302 can resist water absorption or increase traction between the foot of the user and a standing surface.

The ankle pad 304 can include a surface for reducing pressure on the ankle of the user from the tension of the harness 102. For instance, the ankle pad 304 can distribute the holding force of the harness along an increased area around the ankle, foot, or leg. The ankle pad 304 can have a shape that includes, but is not limited to a loop, donut, strap, flat segment, contour, or other shape. Accordingly, the ankle pad 304 can conform to the ankle, foot, or leg of the user or have a contour shape adapted to be molded to the shape of the ankle, foot, or leg of the user. In the example, of FIG. 3, the ankle pad 304 is a strap that is adapted to wrap around the ankle of the user. In an example, a material of the ankle pad 304 can include a fabric, polymer (e.g., nylon or neoprene), leather, natural or synthetic fiber, natural or synthetic rubber, or the like. In one or more examples, the material of the ankle pad 304 can resist water absorption.

A harness fastener 306 can be coupled between two or more segments of at least one portion of the harness 102. The harness fastener 306 can include, but is not limited to, a hook and loop fastener strip, snap, latch, clip, tie, zipper, or the like. The harness fastener 306 can include an open configuration and a closed configuration. For instance, in the closed configuration, the two or more segments of the harness 102 can be coupled to one another. Accordingly, the harness 102 can be secured to the foot of the user. In the open configuration, two or more segments of the harness 102 can be decoupled. Accordingly, the harness 102 is removable from the foot of the user. As shown in the example of FIG. 3, the harness fastener 306 can be located between two or more segments of at least one portion of the harness 102, such as a first and second segment of the ankle loop 110. In an example, the harness fastener 306 can be coupled between two or more segments of the harness 102, such as the toe loop 108, the ankle loop 110, or at least one midportion 114.

Figure 4:
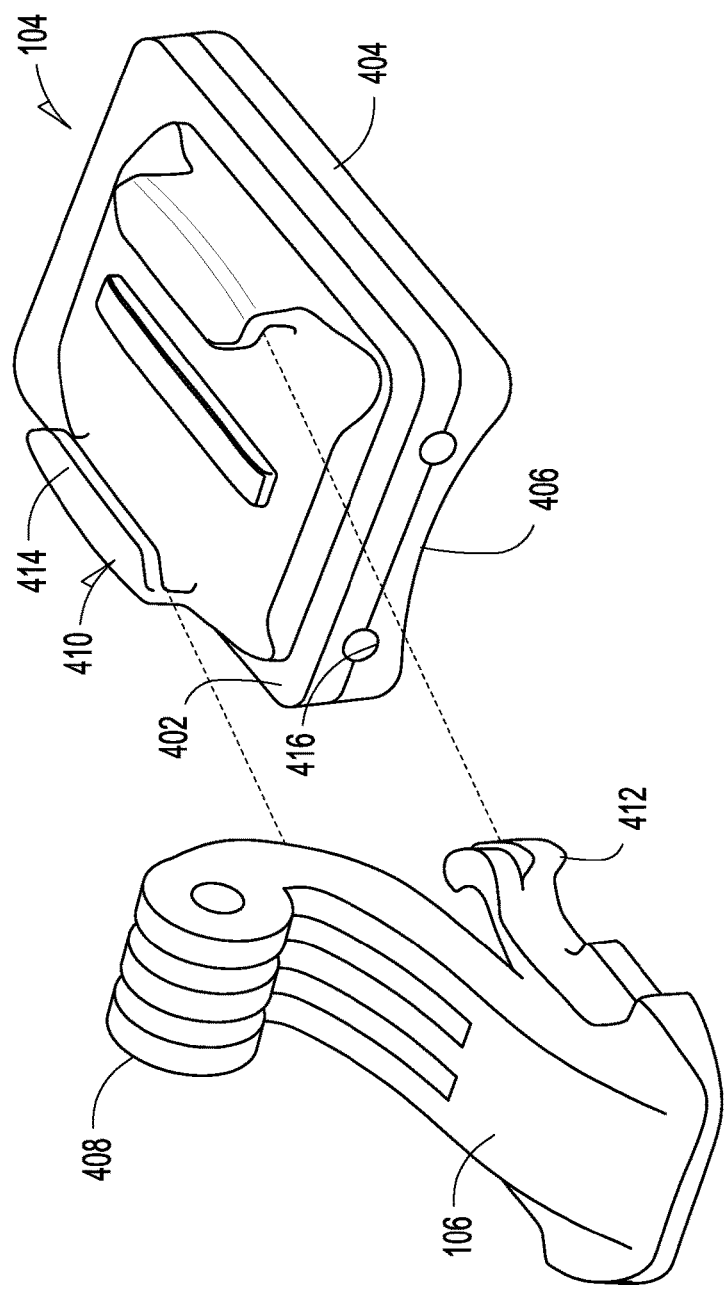
FIG. 4 depicts an example of a base member including a camera mount, according to an embodiment.

FIG. 4 shows a perspective view of the base member 104. As shown in the example, of FIG. 1, the base member 104 can engage with the top of the foot of the user, for instance, to support the action camera 112. The base member 104 can include a length and width that facilitates stability of the action camera 112 on the foot. For instance, the length and width of the base bottom 404 can be between one- and five-inches. The base member 104 can be constructed from materials including, but not limited to, metal, plastic, carbon fiber, fiberglass, or the like. As shown in FIG. 1 and described herein, the base member 104 can be slidably coupled to the harness 102, such as the midportion 114 of the harness 102. For instance, the base member 104 can include at least one channel, slot, aperture, eyelet, or other geometry for slidably coupling the base member 104 to the harness 102. In one example, the base member can be constructed as a single piece component. The single piece base member 104 can reduce the weight or size of the action camera foot mount 100. FIG. 4 illustrates an exemplary base member 104 including a base top 402, a base bottom 404, and a camera mount 106 coupled to the base top 402.

In the example of FIG. 4, the base member 104 includes one or more apertures 416 on a first and a second opposite sides of the base member 104. The base member 104 can include a cavity extended between the two opposing apertures 416. The harness (e.g., midportion 114) can be located through each of the opposing apertures 416 and extend through the cavity. In an example, the base member 104 can include two sets of apertures 416 located on opposite sides of the base member 104. The first midportion 202 can be located through the aperture 416 on the medial side of the base member 104 on the first side of the base member and be located through the aperture 416 on the lateral side of the base member 104 on the second side. The second midportion 204 can be located through the aperture 416 on the lateral side of the base member 104 on the first side and be located through the aperture 416 on the medial side of the base member 104 on the second side. In an example, the first midportion 202 can cross over the second midportion 204 between the first and second opposing sides of the base member 104 (e.g., inside of the cavity).

The base bottom 404 can include a foot interface 406 that is adapted to engage with an upper side of the foot of the user. For instance, the foot interface 406 can include a contour shape to increase an amount of surface area of the foot interface that engages with the foot. In an example, the contour shape can increase the comfort of the action camera foot mount 100. In an example, the foot interface 406 can include a pad. For instance, the pad can include, but is not limited to, foam, rubber, neoprene, or other compliant material for conforming to the foot of the user. The pad can increase the comfort of the action camera foot mount 100 and minimize sliding of the base member 104 on the foot.

The camera mount 106 can include an adapter 408 for coupling an action camera 112 to the camera mount 106 and accordingly to the base member 104. The adapter 408 can include a fastener for coupling the action camera 112 to the camera mount 106. For instance, the fastener can include, but is not limited to a thumb screw, bolt, snap fit, rivet, ball and socket joint, or other fastener. In an example the fastener can be articulated. For example, the adapter 408 can be adjustable to swivel or tilt the action camera 112 with respect to the base member 104. The example of FIG. 4 shows an articulated adapter 408 having a plurality of interlocking hinge surfaces. A thumb screw can couple one or more interlocking hinge surfaces of the action camera 112 to the interlocking hinge surfaces of the adapter 408. In another example, the adapter can include threaded boss and socket, for instance, a tripod connection per ISO 1222:2010, such as ¼-20 UNC or ⅜-16 UNC treaded connection.

In an example, the camera mount 106 can include a camera mount interface 410 for coupling the camera mount 106 to the base top 402. The camera mount interface 410 can include, but is not limited to, a latch, guide, rail, snap, fastener, or the like. For instance, the camera mount 106 can include mating features 412 that are engagable with the camera mount interface 410. In the example, of FIG. 4, the camera mount interface 410 can include a pair of retention members 414. The mating features 412 of the camera mount 106 can latch on to the retention members 414 to couple the camera mount 106 to the base top 402. In an example, the camera mount interface 410 can include a universal action camera mount geometry. For instance, the retention members 414 of the camera mount interface 410 can include geometry used by one or more action camera producers. In an example, the camera mount interface 410 or the retention members 414 can be interchangeable. For instance, the base top 402 can include features for coupling two or more camera mount interfaces 410 to the base top 402, such as a first camera mount interface 410 for coupling a first action camera 112 and a second camera mount interface 410 for coupling a second action camera 112. The first and second camera mount interfaces 410 can be interchangeable for mounting either the first or the second action cameras 112.

In one example, the camera mount 106 and the base member 104 can be constructed as a single component or part. In other words, the camera mount 106 can be integral with the base member 104. For example, the camera mount 106 and base member 104 can be molded as a single component.

Figure 5:
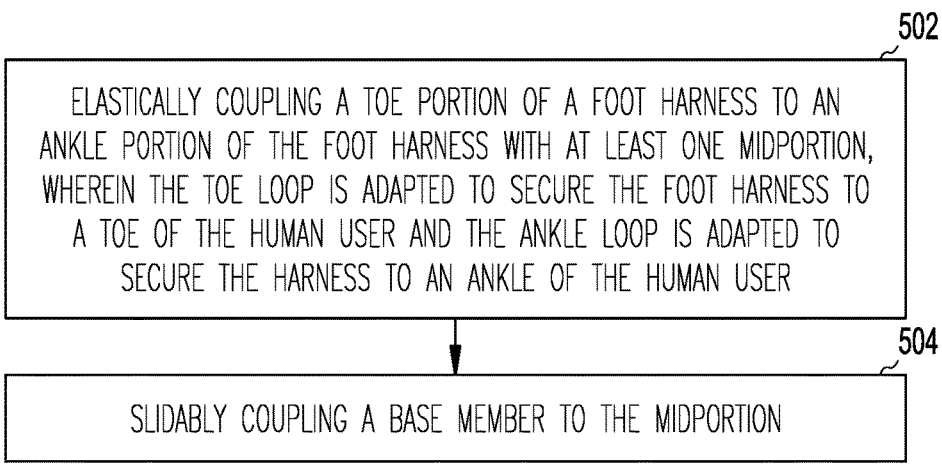
FIG. 5 is block diagram of an exemplary technique for making an action camera foot mount, according to an embodiment.

FIG. 5 is a block diagram of an example of a method 500 making a camera mount, such as the action camera foot mount 100 as previously described in the examples herein and shown, for instance, in FIGS. 1-4. In describing the method 500, reference is made to one or more components, features, functions, and steps previously described herein. Where convenient, reference is made to the components, features, steps and the like with reference numerals. Reference numerals provided are exemplary and are nonexclusive. For instance, features, components, functions, steps, and the like described in the method 500 include, but are not limited to, the corresponding numbered elements provided herein. Other corresponding features described herein (both numbered and unnumbered) as well as their equivalents are also considered.

At 502, the toe loop 108 of the harness 102 can be elastically coupled to an ankle loop 110 of the harness 102 with at least one midportion 114. The toe loop 108 can be adapted to at least partially encircle the toe of the human user to secure the harness 102 to the toe of the human user.

The ankle loop 110 can be adapted to at least partially encircle an ankle of the human user to secure the harness 102 to the ankle of the human user. In an example, the first midportion 202 and the second midportion 204 can be elastically coupled between the toe loop 108 and the ankle loop 110, wherein the first and second midportions 202, 204 are independently stretchable with respect to one another. For instance, the first midportion 202 can be coupled between the medial side of the toe loop 108 and the lateral side of the ankle loop 110. The second midportion 204 can be coupled between the lateral side of the toe loop 108 and the medial side of the ankle loop 110. Accordingly, the first midportion 202 can cross over the second midportion 204 between the toe loop 108 and the ankle loop 110. In an example, coupling at least one midportion 114 between the toe loop 108 and the ankle loop 110 can include coupling the midportion 114 that is an elastic cord. Accordingly, an action camera 112 can be coupled to a foot of a user, such has a bare foot, in a manner that does not interfere with the traction or flexibility of the foot of the user.

In an example, the toe pad 302 can be coupled to the toe loop 108 as previously described herein. For instance, the toe pad 302 can include the contour shape to reduce pressure on the toe of the human user, where the pressure is from tension of the harness 102 on the toe of the human user. In an example, an ankle pad 304 can be coupled to the ankle loop 110. The ankle pad 304 can include the contour shape adapted to reduce pressure on the ankle of the human user, where the pressure is from tension of the harness 102 on the ankle of the human user.

In an example, two or more segments of the harness 102 can be coupled together with the harness fastener 306. The harness fastener 306 can include the open configuration and the closed configuration. In the closed configuration, the two or more segments of the harness 102 can be coupled to one another and the harness 102 can be securable to the foot of the human user. In the open configuration, two or more segments of the harness 102 can be decoupled and the harness 102 can be removable from the foot of the human user. Accordingly, a breakaway safety feature can be provided by the harness fastener 306 to reduce the likelihood of injury to the user in the event that the action camera foot mount 100 becomes ensnared with another object while the user is moving.

At 504, the base member 104 can be slidably coupled to the midportion 114. The base member 104 can include the base top 402 and the base bottom 404. The base bottom 404 can include the foot interface 406 adapted to engage with the upper side of the foot of the human user as previously described herein. Accordingly, lateral stability can be provided to the action camera 112 mounted on the base member 104. The camera mount 106 can be coupled to the base top 402 as previously described herein. In an example, the camera mount 106 can include the adapter 408. The adapter 408 can be structured to support the camera 112 on the base member 104. Accordingly, a unique camera perspective can be provided by the action camera foot mount 100.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The above description is intended to be illustrative, and not restrictive. For example, the above-described examples (or one or more aspects thereof) may be used in combination with each other. Other embodiments can be used, such as by one of ordinary skill in the art upon reviewing the above description.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An action camera foot mount comprising:
 a harness including:
  a toe loop adapted to at least partially encircle a toe of a human user to secure the harness to a foot of the human user;
  an ankle loop adapted to at least partially encircle an ankle of the human user to secure the harness to the ankle of the human user; and
  a midportion disposed between the toe loop and the ankle loop;
 a base member coupled to the midportion, wherein the base member includes a base top and a base bottom, and wherein the base bottom includes a foot interface adapted to engage with an upper side of the foot of the human user; and
 a camera mount interface coupled to the base top, wherein the camera mount interface is attachable to a camera mount structured to support a camera.

2. The action camera foot mount of claim 1, wherein the base member is slidably coupled along the midportion.

3. The action camera foot mount of claim 1, wherein the midportion of the harness includes a first midportion and a second midportion, and wherein the first and second midportions are coupled between the toe loop and the ankle loop and are independently stretchable with respect to one another.

4. The action camera foot mount of claim 3, wherein the first midportion is coupled between a medial side of the toe loop and a lateral side of the ankle loop and the second midportion is coupled between a lateral side of the toe loop and a medial side of the ankle loop, and wherein the first midportion crosses over the second midportion between the toe loop and the ankle loop.

5. The action camera foot mount of claim 1, wherein the midportion is an elastic cord.

6. The action camera foot mount of claim 1, wherein the toe loop includes a toe pad having a contour shape, the contour shape adapted to reduce pressure on the toe of the human user, wherein the pressure is from tension of the harness on the toe of the human user.

7. The action camera foot mount of claim 1, wherein the ankle loop includes an ankle pad having a contour shape, the contour shape adapted to reduce pressure on the ankle of the human user, wherein the pressure is from tension of the harness on the ankle of the human user.

8. The action camera foot mount of claim 1, wherein the harness includes a harness fastener adapted to couple two or more segments of the harness, wherein the harness fastener includes an open configuration and a closed configuration:
 in the closed configuration, the two or more segments of the harness are coupled to one another and the harness is securable to the foot of the human user; and
 in the open configuration, two or more segments of the harness are decoupled and the harness is removable from the foot of the human user.

9. A method of configuring an action camera foot mount comprising:
 elastically coupling a toe loop of a harness to an ankle loop of the harness with at least one midportion, wherein the toe loop is adapted to at least partially encircle a toe of a human user to secure the harness to the toe of the human user, and the ankle loop is adapted to at least partially encircle an ankle of the human user to secure the harness to the ankle of the human user; and
 slidably coupling a base member to the midportion, the base member including a base top and a base bottom, wherein the base bottom includes a foot interface adapted to engage with an upper side of a foot of the human user, and the base top includes a camera mount interface, wherein the camera mount interface is attachable to a camera mount structured to support a camera on the base member.

10. The method of claim 9, wherein elastically coupling the toe loop of the harness to the ankle loop of the harness further comprises elastically coupling a first midportion and a second midportion between the toe loop and the ankle loop, wherein the first and second midportions are independently stretchable with respect to one another.

11. The method of claim 10, wherein elastically coupling the toe loop of the harness to the ankle loop of the harness further comprises coupling the first midportion between a medial side of the toe loop and a lateral side of the ankle loop, and coupling the second midportion between a lateral side of the toe loop and a medial side of the ankle loop, wherein the first midportion crosses over the second midportion between the toe loop and the ankle loop.

12. The method of claim 9, wherein elastically coupling the toe loop of the harness to the ankle loop of the harness with at least one midportion includes coupling at least one midportion that is an elastic cord.

13. The method of claim 9, wherein elastically coupling the toe loop of the harness to the ankle loop of the harness with at least one midportion includes coupling a toe pad to the toe loop, the toe pad having a contour shape to reduce pressure on the toe of the human user, wherein the pressure is from tension of the harness on the toe of the human user.

14. The method of claim 9, wherein elastically coupling the toe loop of the harness to the ankle loop of the harness with at least one midportion includes coupling an ankle pad to the ankle loop, the ankle pad having a contour shape adapted to reduce pressure on the ankle of the human user, wherein the pressure is from tension of the harness on the ankle of the human user.

15. The method of claim 9, further comprising coupling two or more segments of the harness with a harness fastener, wherein the harness fastener includes an open configuration and a closed configuration, wherein:
  in the closed configuration, the two or more segments of the harness are coupled to one another and the harness is securable to the foot of the human user; and
  in the open configuration, two or more segments of the harness are decoupled and the harness is removable from the foot of the human user.

16. An action camera foot mount comprising:
  a harness including:
    a toe loop adapted to at least partially encircle a toe of a human user to secure the harness to a foot of the human user, wherein the toe loop is elastic;
    an ankle loop adapted to at least partially encircle an ankle of the human user to secure the harness to the ankle of the human user, wherein the ankle loop is elastic; and
    a first midportion disposed between a medial side of the toe loop and a lateral side of the ankle loop, wherein the first midportion is elastic; and
    a second midportion disposed between a lateral side of the toe loop and a medial side of the ankle loop, wherein the second midportion is elastic;
  a base member slidably coupled to the first and second midportions, wherein the base member includes a base top and a base bottom, wherein the base bottom includes a foot interface adapted to engage with an upper side of the foot of the human user; and
  at least one camera mount coupled to the base top, wherein the camera mount includes an adapter structured to support a camera.

17. The action camera foot mount of claim 16, wherein the base member is slidably coupled along the first and second midportions.

18. The action camera foot mount of claim 16, wherein the first and second midportions are independently stretchable with respect to one another.

19. The action camera foot mount of claim 18, wherein the first midportion crosses over the second midportion between the toe loop and the ankle loop.

20. The action camera foot mount of claim 16, wherein at least one of the first and second midportions is an elastic cord.

21. The action camera foot mount of claim 16, wherein the toe loop includes a toe pad having a contour shape to reduce pressure on the toe of the human user, wherein the pressure is from tension of the harness on the toe of the human user.

22. The action camera foot mount of claim 16, wherein the ankle loop includes an ankle pad having a contour shape to reduce pressure on the ankle of the human user, wherein the pressure is from tension of the harness on the ankle of the human user.

23. The action camera foot mount of claim 16, wherein the harness includes a harness fastener adapted to couple two or more segments of the harness, wherein the harness fastener includes an open configuration and a closed configuration, wherein:
  in the closed configuration, the two or more segments of the harness are coupled to one another and the harness is securable to the foot of the human user; and
  in the open configuration, two or more segments of the harness are decoupled and the harness is removable from the foot of the human user.

* * * * *